United States Patent [19]

Molitor

[11] 4,451,960
[45] Jun. 5, 1984

[54] METHOD OF PRODUCING MULTIPLE COIL, MULTIPLE TUBE HEAT EXCHANGER

[75] Inventor: Victor D. Molitor, Denver, Colo.

[73] Assignee: Molitor Industries, Inc., Englewood, Colo.

[21] Appl. No.: 20,615

[22] Filed: Mar. 15, 1979

[51] Int. Cl.³ .................. B23P 15/16; B21D 53/06
[52] U.S. Cl. .................. 29/157.3 R; 165/165; 228/183
[58] Field of Search .................. 29/157.3 R, 458; 165/156, 163, 164, 165; 156/173, 296; 228/175, 183

[56] References Cited

U.S. PATENT DOCUMENTS

| | | | |
|---|---|---|---|
| 1,799,081 | 3/1931 | Blomquist | 165/164 |
| 1,965,553 | 7/1953 | Lear | 165/165 X |
| 2,697,868 | 12/1954 | Arant | 29/157.3 R |
| 3,554,275 | 1/1971 | Schade | 165/156 |
| 3,763,001 | 10/1973 | Withers | 156/173 X |
| 3,839,963 | 2/1974 | Maher | 29/157.3 R |
| 4,123,837 | 11/1978 | Horner | 29/157.3 R |

Primary Examiner—Kenneth J. Ramsey
Attorney, Agent, or Firm—Horace B. Van Valkenburgh

[57] ABSTRACT

A method of producing multiple coil, multiple tube heat exchanger from circular tubes, in which alternating turns in each coil have a warmer liquid and other turns a cooler liquid, by coating the outside of each coil with a heat conductive mastic and winding the next coil against the mastic to force the mastic into spaces between adjoining tubes of the first coil, into spaces of adjoining tubes of the second coil and into spaces between opposed tubes of first and second coils. Mastic applied to outside of each coli or into grooves between turns as next coil wound. Double tubes of each coil preferably wound into grooves between turns of preceding coil. Second tube of each coil started across coil from first tube and continued at end of coil past first tube. Succeeding coils wound against mastic in same manner. Turns of first coil attached together, as by soldering, while first and last turns of succeeding coils similarly attached to adjacent turn of coil beneath. Succeeding coils may be terminated between second and third turns of coil beneath, or with appropriate inner diameter of first coil, terminated between last two turns of coil beneath. Several coils may be formed of tubing of the same diameter, with additional coils of tubing of greater diameter, all coils of tubing of same diameter, or all coils of tubing of successively increasing diameter. Length of coils proportioned with respect to diameter of tubing so that liquid will take the same amount of time to flow from one end of each coil to the other.

13 Claims, 13 Drawing Figures

METHOD OF PRODUCING MULTIPLE COIL, MULTIPLE TUBE HEAT EXCHANGER

This invention relates to a method of producing a multiple coil, multiple tube heat exchanger, and particularly such a method in which the tubes are generally circular in cross section.

BACKGROUND OF THE INVENTION

With the advent of the energy crisis, there has been considerable interest in the recovery of energy which might otherwise be lost, such as the heat contained in the fluid discharged from a dishwasher or the like. In my copending application Ser. No. 920,660 filed June 30 1978, now abandoned, there is disclosed a method and apparatus for recovery of waste energy, as from a dishwasher. An important part of this method and apparatus is a liquid to liquid heat exchanger, through which waste water, such as discharged from a dishwasher, is passed in order to heat fresh water, such as the incoming feed water for a hot water heater. Such heat exchange avoids the heat being lost in the used wash water through its being discarded through a conventional drain. However, the temperature differential between the warmer liquid, such as waste water, and the cooler liquid, such as hot water heater makeup water, may be relatively slight, so that the heat exchanger must necessarily be highly efficient to transfer the maximum amount of heat from the warmer liquid to the cooler liquid. An effective and efficient heat exchanger is also disclosed in the aforesaid application Ser. No. 920,660, consisting of sets of multiple tubes, such as three, in spaced, spiral relation between thin cylinders. For more effective heat transfer, the warmer liquid is circulated through the tubes, while the cooler liquid is forced to follow a circuitous path between the turns of the respective spiral coils, to achieve maximum contact time of the cooler liquid with the exterior walls of the coils. In such a heat exchanger, the tubes of the coils abut to force the liquid to be heated to follow such a spiral path. However, in such a heat exchanger, if a leak occurs in any tube of the coil, the contaminated water will leak out into the fresh water being heated. Since a hot water heater, in many instances, not only supplies a dishwasher but also wash basins, certain plumbing codes reduce considerably the use of such a heat exchanger. Thus, it is desirable to provide an efficient and effective heat exchanger in which the warm liquid and cool liquid each flow in separate tubes.

In U.S. Pat. No. 1,965,553, a series of rectangular or triangular tubes in concentric cylindrical coils are wound in spiral relation from the inside out, so that heat will be transferred between different liquids, such as a refrigerant in one tube forming alternating turns of a coil, with other liquids in different tubes, such as liquids to be cooled, in the alternating turns of different coils. The heat exchange between the tubes is effected by metal to metal contact of the tubes. When the tubes are rectangular, two sides of each tube are in metal to metal contact with the abutting sides of adjoining turns of the same coil, while the top and bottom of each turn is in metal to metal contact with the bottom and top, respectively, of the turns of adjacent inner and outer coils, When the tubes are triangular in cross section, the apices of the triangles point outwardly in a toothed arrangement in alternating cylindrical coils with the apices of the tubes pointing inwardly to intersect the preceding apices. Thus, there is theoretically produced metal to metal contact of each side of a triangular tube with the sides of the triangles in adjacent turns of the same coil. Also, the base of each triangular tube in the respective coils will face alternately inwardly and outwardly, so that the base of a triangle in one coil will be in metal to metal contact with the base of a triangle of a tube turn of the next inner or outer row. Although the metal to metal contact of the rectangular or triangular tubes is conducive to heat exchange, the turns, due to deformation, misalignment, twisting or other conditions, may reduce the heat exchanged. There are also numerous problems involved in the construction of such a heat exchanger, particularly since both the rectangular and trianglar tubes must always be kept in essentially perfect alignment with the turn whose side, top or bottom walls are to be engaged. Since tubing is generally wound in a coil, the unwinding and rewinding in a specific relationship often produces a tendency for the tube to twist, such twisting often causing difficulty in rewinding. In addition, the cost of producing rectangular or triangular tubes is much greater than that of circular or cylindrical tubes, with the result that the cost of a heat exchanger having rectangular or triangular tubes may exceed the value of the energy which might be recovered within a reasonable time.

It is generally known to use a heat conductive mastic, i.e. a resin having heat conducting properties to improve heat conductivity between metals, as in U.S. Pat. Nos. 3,554,275 and 3,666,006 and British patent No. 938,372. Also, in U.S. Pat. No. 4,123,837, the use of a heat conductive mastic to improve heat transfer between a pipe and a much larger conduit or vessel is proposed, with an angular cover for the mastic to retain the mastic in position. It is also suggested that the mastic may be applied to the larger vessel and the heating pipe pushed into the mastic. Nevertheless, these prior patents do not disclose the novel features of the present invention.

It will also be noted that a coil can be coated by dipping in a liquid, such operation normally being used for waterproofing or insulation purposes. However, the heat conductive mastic must be heated to a relatively high temperature before it becomes a liquid, and even a dipping operation will not insure that the interstices between all the coil turns, particularly those deep within the coils, will be filled.

Among the objects of this invention are to provide a novel method of producing a multiple coil, multiple tube liquid to liquid heat exchanger; to provide such a method which is particularly adapted to be utilized with tubing having a circular cross section; to provide such a method which enables a heat conductive mastic to transfer heat between a warmer liquid in one or more turns of a coil and a cooler liquid in one or more turns of the same or adjacent coils; to provide such a method which will produce an effective contact of mastic with essentially the entire surface of each tube for the length of each coil to insure that the mastic will fill the spaces between adjacent turns of each coil, as well as to insure that the mastic will fill the spaces between the turns of successive coils; to provide such a method which will insure that the mastic will remain in essentially compressed position between the turns of the respective coils; to provide such a method which will be simple and effective in operation; and to provide such a method which may be carried out without undue expense.

SUMMARY OF THE INVENTION

In accordance with this invention, a heat exchanger is produced from a plurality of cylindrical coils, each formed from multiple tubing of essentially circular cross section and through which different liquids are to be passed, with the usual number of tubes being two, i.e. a first tube through which a warmer liquid is passed and a second tube through which a cooler liquid is passed. A mastic layer is provided in the interstices between the turns of the tubes forming adjacent cylindrical coils, and also on the inside and outside of the turns of the inner and outer coils. Preferably, the turns of each coil are generally in contact with the adjacent turns of the same coil and also with the turns of the adjacent coil, both beneath and above. A principal feature of this invention is the placement of a mastic layer on the outside of each coil, after winding, and winding the turns of the next coil against the preceding coil, so as to squeeze the mastic layer into the interstices between the coil turns. The mastic layer may be applied to the outside of one coil, after its completion, to the entire length of the coil before winding the next coil. Or the mastic layer may be applied in the form of beads or ribbons from a pressure gun or the like, as the next coil is being wound, so that the mastic is applied only as the turns of the next coil are wound against the previous coil. In order to minimize flattening or kinking, the tubes are merely subject to sufficient force to bend them, but this produces sufficient compression to insure that the mastic will be pushed into all of the desired interstices. In further accordance with this invention, a first cylindrical coil of dual tubes may be wound on a mandrel, mastic applied, then a second coil wound around the first coil, mastic applied, and additional coils wound around each previous coil and mastic applied until a desired number of coils has been obtained. In addition, the first turn of each coil is preferably made in the groove between two turns of the preceding coil, such as the first two, not only to provide a desirable position for each turn of the next coil to compress the mastic, but also to reduce the cross sectional area of the interstices between the coils. Since it is preferable that the rate of flow of the liquid through each coil be essentially the same, the diameter of the coils may be increased as the coils progress outwardly, in order to provide a greater volume for the longer path of flow through an outer coil and thus insure that the liquid which enters the alternating tubes of the several coils will arrive at the exit at approximately the same time. It is also possible, through a proper proportioning of the inside diameter of the innermost coil and winding each coil to an appropriate position, such as between the second and third to last turns of the preceding coil, to use the same diameter tubing for each coil, i.e. each tube thereby having the same total volume as other tubes of the same or another coil. In addition, the turns of the first coil are preferably attached together, as by soldering, to prevent the coil from unwinding when released from a winding mechanism. Also, the first and last turn of each coil, outwardly from the first coil, is attached, as by soldering, to the exposed adjacent turn of the previous coil. Another advantage of winding the turns of the next coil as nearly as possible into the grooves between turns of the preceding coil is that, with the turns of the first coil secured together, there is much less tendency for the next and additional coils to unwind after release from the winding mechanism.

The winding operation may be carried out by machine or on a rotating mandrel, to which may be attached special jigs for holding the initial ends of the tubes of the respective coils during winding.

THE DRAWINGS

The foregoing and additional features will become more readily apparent from the following description, taken in conjunction with the accompanying drawings, in which.

PREFERRED EMBODIMENT OF THE INVENTION

Figure 1:
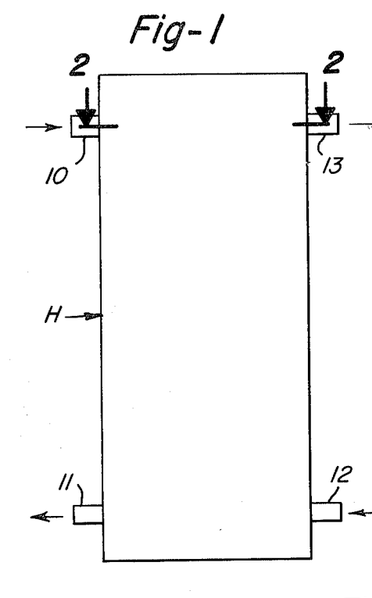
FIG. 1 is a side elevation of a heat exchanger produced in accordance with the method of this invention.

A heat exchanger produced by the method of this invention may be installed, as in FIG. 1, within a housing H from which connections 10, 11, 12 and 13 extend, in opposite directions, from the upper and lower portions thereof. It will be understood that the housing H may be installed in a vertical position, as shown, or in a horizontal position, or in any appropriate angular position. Also, the housing H may be supported by a pedestal, stand, or the like, or may be suspended from a support above it, or mounted on a wall, partition or the like, as by an appropriate bracket. The heat exchanger in housing H, as in FIG. 2, may include a series of concentric coils, such as inner coil $C_1$, intermediate coils $C_2$ through $C_7$, respectively, and an outer coil $C_8$. The opposite ends of the tubes forming these coils extend to the appropriate connection 10, 11, 12 or 13. Each of these coils is a dual tube coil, i.e. a first tube for one liquid, such as hot or warmer, and a second tube for another liquid, such as cold or cooler. It will be understood, of course, that two or more liquids to be heated or cooled may be circulated separately from each other in additional tubes of the respective coils. As indicated, such a heat exchanger is particularly adapted for use in the method of and apparatus for recovery of waste energy of my copending application Ser. No. 920,660 filed June 30, 1978.

Figure 2:
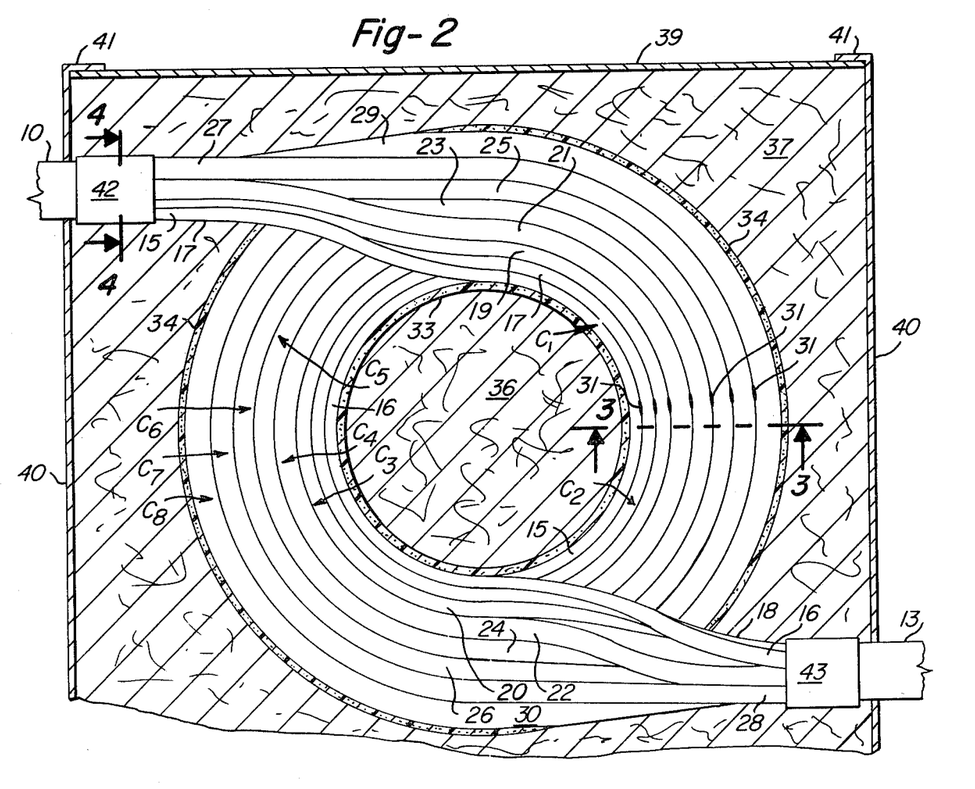
FIG. 2 is a cross section, on an enlarged scale, of the heat exchanger of FIG. 1 taken along line 2—2 of FIG. 1 but including a top plan view of the coils inside.
Figure 3:
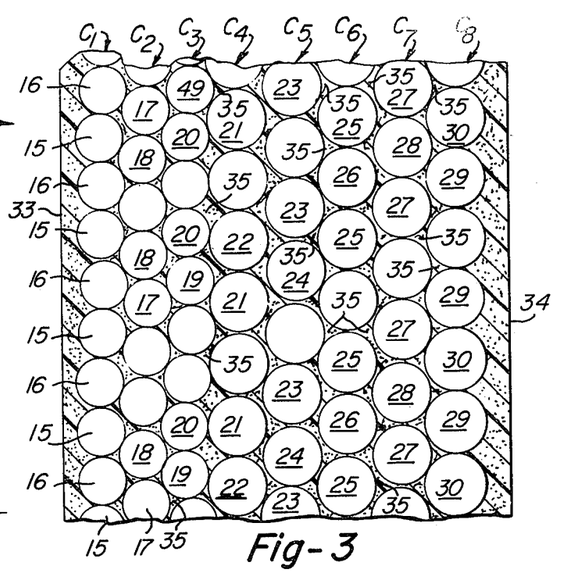
FIG. 3 is a fragmentary vertical section, on a further enlarged scale, taken at the position of line 3—3 of FIG. 2.

As in FIGS. 2 and 3, coil $C_1$ is formed by a pair of tubes 15 and 16 of essentially circular cross section, the first of which extends between the connections 10 and 11, while the other extends between the connections 12 and 13. Thus, tube 15 carries warmer liquid, from top to bottom as indicated by the arrows at connections 10 and 11, while tube 16 carries cooler liquid, from bottom to top, as indicated by the arrows at connections 12 and 13. The tubes 15 and 16 are wound simultaneously about the same radius, to form the coil, with the turns of the respective tubes 15 and 16 alternating. Similar tubes 17 and 18 form the second coil $C_2$, again extending between the respective connections 10, 11 and 12, 13, and being wound longitudinally about essentially the same radius, so that the turns of the tubes 17 and 18 again alternate. Coil $C_3$ is formed from similar tubes 19 and 20, again extending between the respective connections 10, 11 and 12, 13 and being wound about essentially the same radius in longitudinal relation, so that the turns of tubes 19 and 20 will again alternate. The tubes 15, 16, tubes 17, 18 and tubes 19, 20 are shown as being of the same diameter, while tubes 21 and 22 of the fourth coil $C_4$ are shown as of a larger diameter, but again extend between the respective connections 10, 11 and 12, 13 and also may be wound about essentially the same radius, again in longitudinal, alternating relationship. Similar tubes 23 and 24 forming coil $C_5$, tubes 25 and 26 forming coil $C_6$, tubes 27 and 28 forming coil $C_7$ and tubes 29 and 30 forming coil $C_8$ may have the same diameter as the tubes 21, 22 of coil $C_4$. The tubes of each of these coils are again wound in longitudinal relation, so that the turns of the tubes will alternate in the coil, with the turns of each coil being wound about essentially the same radius so that the diameter of each turn will be essentially the same as the other turns of that coil. In accordance with this invention, the first turn of each coil may also, during winding, be connected to the first turn of the previous coil, as by solder or the like connections 31 of FIG. 2. Other connections will be described later. The tubes forming the coil are conveniently formed of annealed copper or a copper alloy in sufficiently soft condition to permit bending into coil shape, copper being advantageous because of its high heat conductivity and also facilitates connections, as by soldering. However, a suitable aluminum or aluminum alloy, although having a slightly less thermal conductivity than copper, may be a sufficiently less expensive metal to result in a lesser total cost of installation and use. Other heat oonductive materials may also be found suitable.

The preferred construction of the heat exchanger includes a layer 33 of a heat conductive mastic on the inside of coil $C_1$ and a similar layer 34 of heat conductive mastic on the outside of coil $C_8$. Also, mastic 35 extends between the turns of each coil and also between the turns of the adjacent coils. In accordance with this invention, the mastic is placed under compression during the winding operation, so as to squeeze out any air, insure a contact of the mastic with the entire surface of each tube for the length of each coil, insure that the mastic will fill the spaces between adjacent turns of each coil and also insure that the mastic will fill the spaces between the turns of each coil and the turns of the next outer and inner coil.

The mastic may be a heat conductive mastic, such as that supplied by Virginia Chemicals, Inc. of Portsmouth, Va., which is composed of synthetic resins, plasticizers and a thermal conductive filler, such as aluminum particles. Among the specifications for this mastic are that it has little or no odor, adheres well to clean, dry surfaces, has a shrinkage of nil, is not absorptive of water vapor and is resistant to vapor tansfer. This mastic also is specified as having a reading under ASTB Test D217-526 of 25.0 to 32.0 mm, a rheometer reading, based upon a 0.104 orifice at 20 psi and 77° F., of 75-175 seconds, a minimum flash point of 450° F., no slump of a ¼ inch bead at 850° F. It is further specified that this mastic will not melt or run at 220° F., will not become brittle at −50° F. and has a pH of 7.0+. It is possible that other mastics may be utilized, such as those referred to as "heat transfer cements" in U.S. Pat. No. 4,123,837, i.e. those commercially available under the trade names "Konduct", obtainable from John L. Lord & Sons Ltd. of Bury, Lancashire, England, "Thermon", obtainable from Thermon Manufacturing Company of Texas, U.S.A., and "Thermfas" obtainable from Atlas Preservative Co. Ltd., of Erith, Kent, England and Benjamin Foster Company of U.S.A.

Figure 4:
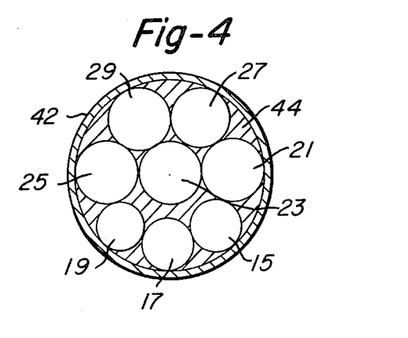
FIG. 4 is a cross section, on a further enlarged scale, of a tube fitting, taken along line 4—4 of FIG. 2.

Insulation 36, such as of the fiberglass and polyurethane or polystyrene type, to provide coil support, as for shipping, may be placed within the inner coil $C_1$ and similar insulation 37 may be placed outwardly of the outer coil $C_8$ and at the ends of the coils, within the opposed sides 39 and 40 of housing H and conventional ends therefor. The sides of the housing may be attached together in a suitable manner, as through the use of flanges 41 on sides 40, for connection to the sides, as by welding. The ends of the housing may be attached to the sides in the same manner, or may be removable to provide access to the coils inside the housing. Preferably, the connections 10, 11, 12 and 13 extend through the sides 40 of the housing, each connected to a sheath or sleeve 42 or 43, respectively, surrounding the ends of the tubes carrying the same liquid, as in FIG. 2. Thus, sheath 42 may be attached to connection 10 and surrounding the ends or tubes 15, 17, 19, 21, 23, 25, 27, 29 carrying one liquid, such as the warmer liquid, while sheath 43 may surround the ends of tubes 16, 18, 20, 24, 26, 28, 30, carrying the other liquid, such as the cooler liquid. As in FIG. 4, the ends of the tubes to be attached to the inside of sheath 42, for instance, may be inserted in the sheath, as with one tube at the center and the remainder surrounding it, or any other suitable arrangement which will minimize the space between the tubes and/or the sheath. Then, the outside of the tube ends are attached to each other and to the inside of the sheath, as by a suitable material 44, such as Sil-fos, applied by a soldering, brazing or similar operation. The position of the heat exchanger is preferably vertical or upright, so that drainage to prevent freezing may be accomplished. Countercurrent heat exchange is preferable, as indicated. If the heat exchange is to take place between a heated liquid which is discharged to the heat exchanger intermittently, such as from a dishwasher, it may be desirable that the inlet for the warmer liquid be at the bottom and the inlet for the cool liquid at the top, as at connections 11 and 13, respectively, so that the capacity of the coils carrying the warmer liquid may be equal to the amount of liquid intermittently discharged from the dishwasher, for instance. Thus, the warmer liquid may stand in the heat exchanger to permit the cooler liquid to extract the greatest amount of heat from the warmer liquid.

Figure 5:
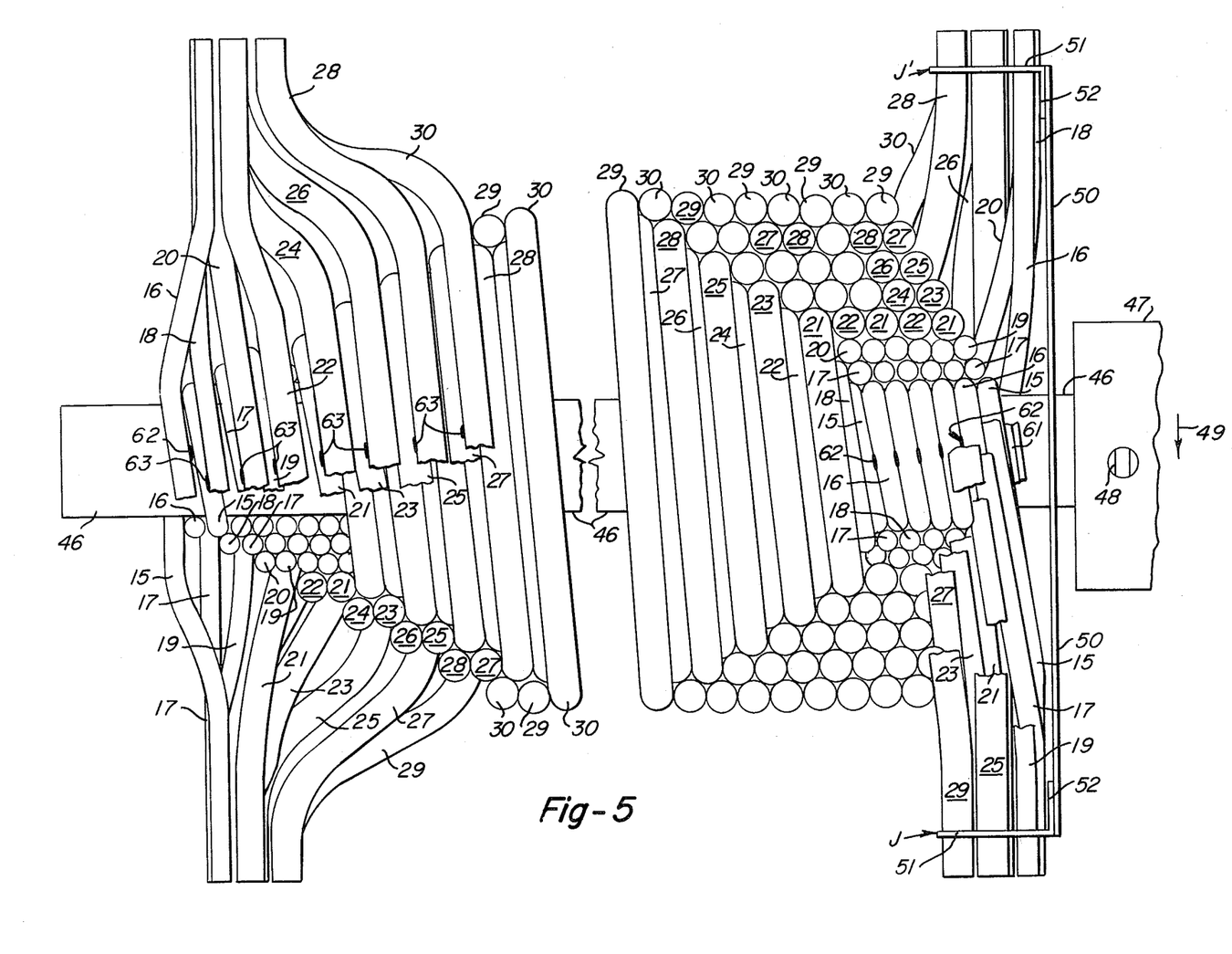
FIG. 5 is a fragmentary side elevation illustrating a dual coil winding operation of the method of this invention, the application of a heat conductive mastic being omitted for clarity of illustration.
Figure 6:
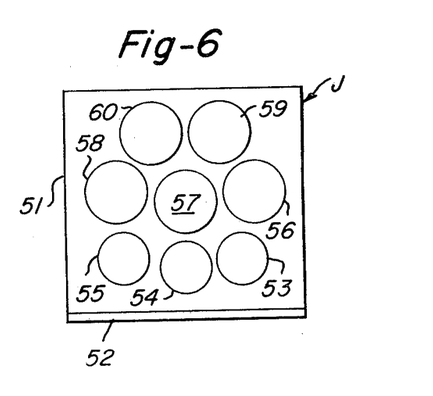
FIG. 6 is a front view of a jig used in the dual coil winding operation of FIG. 5.

As will be evident from FIG. 3, the tubes carrying the warmer liquid, such as tubes 15, 17, 19, 21, 23, 25, 27, 29, alternate in each coil with the tubes carrying the cooler liquid, such as tubes 16, 18, 20, 22, 24, 26, 28 and 30. Each tube carrying warmer liquid further generally opposes tubes in each adjacent coil carrying cooler liquid, but for approximately the same area of each. Thus, there is not only transfer of heat between tubes in the same coil, but also between tubes in adjacent coils. Normally, the tubes of each coil will engage adjacent tubes of that coil, as well as tubes of adjacent coils, at an approximate point of tangency. Over the remainder of the opposed areas, the mastic 35 between the tubes increases considerably the amount of heat transferred across the spaces between adjacent tubes of the same coil, as well as across the spaces between tubes of adjacent coils, In accordance with this invention and as illustrated in FIG. 5, a method of producing a multiple coil, multiple tube liquid to liquid heat exchanger includes the formation of an inner coil $C_1$, conveniently by wrapping the separate tubes 15 and 16 in alternating relation about a mandrel 46, mounted in a rotating chuck 47 having a clamping adjustment 48 and rotated in a suitable direction, as in the direction of arrow 49. The ends of the respective tubes 15 and 16 may be placed in a jig J or J' in a position extending generally tangentially toward the mandrel. Jigs J and J' are mounted at an opposite end of a bracket 50 and each includes a plate 51 of FIG. 6 having a flange 52 for removable attachment to the bracket 50. Jigs J and J' are essentially the same in construction and each jig plate 51 is provided with holes of a suitable diameter for receiving the end of the respective tube and also preferably arranged in a position such that, after winding, the tubes may be more readily placed in the sheath 42 or 43. As will be evident, the arrangement of the holes for receiving the tubes is within a generally circular outline so that, when the jig J or J' is removed, the ends of the tubes may be squeezed together and fitted into the corresponding sheath. Thus, the jig plate 51 may be provided with a hole 53 for tube 15 or 16, a hole 54 for tube 17 or 18, a hole 55 for tube 19 or 20, a hole 56 for tube 21 or 22, a hole 57 for tube 23 or 24, a hole 58 for tube 25 or 26, a hole 59 for tube 27 or 28, and a hole 60 for tube 29 or 30. As will be evident, the arrangement of the holes in jig J corresponds generally to the arrangement of the tubes in the sheath, as in FIG. 4. When the inner coil $C_1$ is to be wound on the mandrel 46, the first tube to be wound, such as tube 15, may be placed against an abutment 61 mounted on the mandrel 46, to stabilize the turns of the coil and maintain them in an inclined position during winding. In general, the tube 15 is inserted in the appropriate hole 53 in jig J and started around the mandrel against abutment 61. Then, the tube 16 is placed in the appropriate hole 53 in jig J' and placed against the mandrel alongside tube 15, but on the opposite side of the mandrel from abutment 61, as will be evident from FIG. 2. Then, the tubes 15 and 16 are wound together about the mandrel in as closely abutting relationship as possible. In order to maintain the relationship of the turns of coil $C_1$, which forms the base for subsequent coil winding, the turns of coil $C_1$ are conveniently attached together, as by solder 62, either as each double turn is wound or after several double turns have been wound. This attachment of the coil turns together guards against a tendency for the coil to unwind or the turns of the coil to be spread apart, when the next coil is wound against it. The tubes 15 and 16 extend from opposite sides of the mandrel and may then be cut at an appropriate position, if not precut, then the ends may be bent slightly toward the opposite end of the coil to assume a position useful for insertion in a sheath 42 or 43. It will be noted that while tube 15 provides the first turn of coil $C_1$, tube 16 provides the last turn thereof, in order to equalize the volume of the two tubes in the coil. The next coil $C_2$ is wound on the first coil $C_1$, after or as a mastic has been or is applied to the outside of coil $C_1$, so that when the second coil $C_2$ is wound onto the first coil, the mastic will be compressed by the winding of tubes 17 and 18 against coil $C_1$ and squeezed into the spaces between the turns of coil $C_1$ and also coil $C_2$, as well as into the spaces between coils $C_1$ and $C_2$. In accordance with this invention, the second coil, after its tubes 17 and 18 have been inserted in the appropriate holes in jigs J and J', is wound against the initial coil by placing the first turn of the next coil between two turns of the previous coil, normally the first two turns. The first turn of the second coil, i.e. of tube 17, is also attached to the previous coil, as by solder 31 of FIG. 2, as the winding of the next coil is begun against the mastic on the preceding coil. This tends to maintain the position of the next coil relative to the previous coil. Also, particularly when the next coil is formed of tubes of essentially the same diameter as the previous coil, the placement of each turn of a coil in the groove between turns of the coil beneath it further stabilizes the coil being wound and assists in preventing the coil turns from unwinding or separating when the pressure of a succeeding coil being wound is exerted against it. At the opposite end of the coils, each tube 17 and 18 extends from opposite sides of the coil and tangentially from between two turns of the preceding coil, preferably between the second and third from last turns. The last turn of tube 18 of coil $C_2$ is also attached to the preceding coil, as by solder 63 of FIG. 5. The respective tubes, after winding and attachment to the previous coil, may be cut, if not precut, and the ends bent to a configuration which will facilitate their being placed in a sheath, as before, such as in the configuration shown at the left in FIG. 5. Thus, the attachment of the last turn of each coil to the previous coil maintains the tube in the position bent. Coil $C_3$ is similarly wound on coil $C_2$ by placing the end of tube 19 in hole 50 of jig J, then wound a half turn into the mastic in the groove between the first two turns of coil $C_2$ and attached thereto, while the end of tube 20 is placed in hole 50 of jig J' and placed alongside tube 19 and the two tubes wound together against the mastic to complete coil $C_3$, the last turn of which is attached to coil $C_2$ beneath. Since tubes 17, 18 and 19, 20 may be of the same diameter as tubes 15, 16, there is no difficulty in engaging the turns of coils $C_2$ and $C_3$ with the grooves between the turns of the preceding coil, against the mastic, of course. Also, the first turn of tube 21 of coil $C_4$, after the end is placed in hole 56 of jig J, is placed against the groove between the first and second turns of coil $C_3$ and will fit into the groove even though the tube 21 is larger in diameter than tubes 19 or 20. Also, tube 21 may, for its first half turn, follow in that groove and be attached to preceding coil $C_3$ beneath. Thus, after the end of tube 22 is placed in hole 56 of jig J', the tube 22 may be abutted against tube 21 and the two wound together, against the mastic, with tube 21 following the groove for the first 360° of winding of coil $C_4$. As will be evident from FIG. 3, further turns of coil $C_4$ do not necessarily fully engage the grooves between turns of the preceding coil, but ride onto the turns of the prior coil until the number of turns times the difference in diameter equals the diameter of the tubes of the preceding coil, when one full turn of coil $C_4$ will again fit directly into a groove between turns of the preceding coil. When the end of coil $C_4$ is reached, tube 21 is extended tangentially from the coil and tube 22 wound for an additional half turn, then attached to the coil beneath, as by solder 63, and extended tangentially from the coil. Then the tubes may be cut off, if not precut, and bent to an appropriate position for easier insertion in a sheath 42 or 43. Since the tubes of coils $C_5$ through $C_8$ are shown as having the same diameter as the tubes of coil $C_4$, there should be little or no difficulty in fitting the tubes of the respective coils into the grooves between turns of the preceding coils, when winding against the mastic. Thus, coils $C_5$ through $C_8$ may be installed in essentially the same manner as described for coil $C_4$, it being noted that the last turn of coil $C_4$ should extend generally from between the second and third from last turns of coil $C_3$ but that the turns of coils $C_5$ through $C_8$ may readily be extended from between the second and third from last turns of the preceding coil. This relationship is indicated at the left in FIG. 5, although the tube 22 of coil $C_4$ which is shown as abutting the third from last tube 20, in the lower section, will be closer to the groove between tubes 19 and 20 of coil $C_3$ when tube 20 actually extends from the coil at a position approximately 90° from the section.

Figures 7, 8, 9, 10:
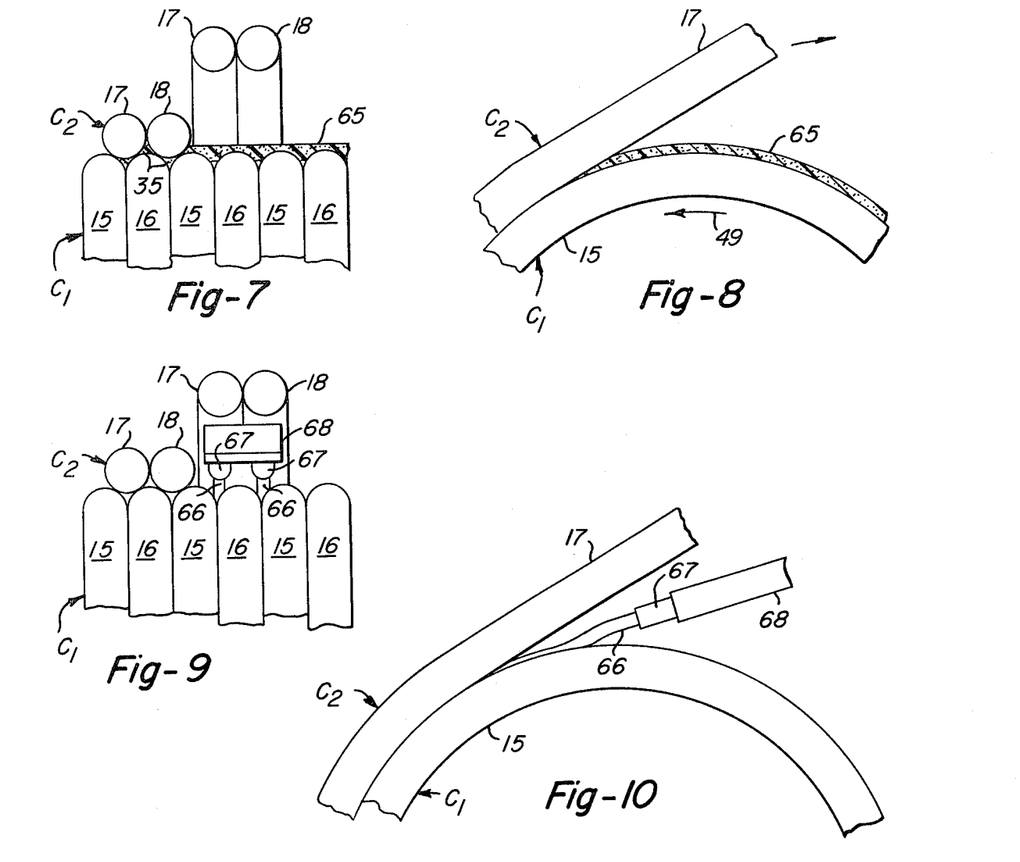
FIG. 7 is a fragmentary view, in side elevation but partly in section, illustrating the application of mastic to each dual coil after winding.
FIG. 8 is a fragmentary end view also showing the mastic application of FIG. 7.
FIG. 9 is a fragmentary side elevation similar to FIG. 7, but illustrating an alternative application of the mastic.
FIG. 10 is a fragmentary end view also showing the alternative application of mastic.

Copper or an alloy thereof is a preferred material for the tubes for two reasons: first, copper tubes are readily bent and tend to stay in the desired position, and second, parts of such metal are more readily attached together by a reasonably low temperature operation, such as soldering. In applying the mastic to the coil which has been wound prior to winding the next coil thereon, any suitable method may be used, two of which are illustrated in FIGS. 7-10. Thus, as in FIG. 7, a layer 65 of mastic may be applied to the outside of the previous coil, such as coil $C_1$, for its entire length, as by a trowel, prior to winding the tubes of coil $C_2$ onto the previous coil. The application of the mastic layer 65 to the entire periphery of the previously wound coil is convenient for a hand winding operation, in which the tubes being wound are guided onto a rotating assembly by hand, or by a jig which is hand operated. As will be evident, the mastic is placed on the previous coil to a depth such that the grooves between the previous coil and the next coil will be completely filled, as well as the spaces between the turns of the previous coil and the next coil. As indicated in FIG. 7, the mastic does not need to be forced initially into all of the cross sectional areas of the grooves between the turns of the previous coil, since the pressure of the tubes of the next coil, as it is wound, such as tubes 17 and 18, will squeeze the mastic into the spaces as the tubes 17 and 18 are maintained in a tangential relation to the previous coil, and the assembly is rotated in the direction of arrow 49. The effect of this rotation is to cause the tubes 17 and 18 to move into the grooves in tubes 15, 16 and to extrude the mastic into all of the spaces mentioned above.

An alternative method of applying the mastic is illustrated in FIGS. 9 and 10 in which a pair of mastic beads 66 are deposited in the respective grooves between the turns of the previous coil and into which the tubes being wound are to be forced. Such mastic beads may be discharged through nozzles 67 of a pressure gun 68 which may be of any suitable type. As in FIG. 10, the winding of tubes 17 and 18 of coil $C_2$, for instance, onto coil $C_1$ will force tubes 17 and 18 into engagement with tubes 15 and 16 and thereby compress the mastic beads 66 into the grooves between tubes 15 and 16, as well as into the grooves between tubes 17 and 18. Such compression will also express any air from the mastic and will also force the mastic, when applied in appropriate quantity, into all of the interstices between coils $C_1$ and $C_2$. As will be evident, excess mastic will tend to be forced ahead of tubes 17 and 18 as they are wound onto coil $C_1$. When nozzle 67 and gun 68 are used, it may be desirable to change nozzles to those having a different spacing and different capacity when applying mastic to the grooves between turns of tubes of a larger diameter, such as those of coils $C_4$ through $C_7$. The thermal mastic supplied by Virginia Chemicals, previously referred to, is particularly adapted to be discharged through a gun as a bead, ribbon or the like. Of course, such a gun may also be utilized in connection with a hand operation, although it is particularly adaptable for use in a machine operation, in which the respective coils are wound by a coil winding machine. Of course, there may be some hand operations involved, such as the initial setup of the tubes in the jig, the attachment, as by soldering, of the turns of the initial tube together, and the attachment, as by soldering, of the first and last turns of each subsequent coil to the previous coil.

After the coils have been wound and the attachments of the coil turns made, the ends of the respective tubes may be placed in the respective sleeves and the tube ends attached to the sleeve and to each other. This may be accomplished, either before or after the assembly is removed from the mandrel. The mandrel is generally horizontal, as indicated, but may have a slight taper to facilitate the removal of the coil assembly after winding, or the mandrel may be the well known collapsible type in which one or more segments are withdrawn inwardly and the remaining segments collapsed slightly, or any other suitable type. After inner and outer mastic layers 33 and 34 of FIG. 2 are applied, as well as mastic layers on the ends of the coils, the assembled coils may be placed in the housing H and connections 10, 11, 12, 13 attached to the respective sheaths. Preferably, the inner insulation 36 and outer insulation 37, as well as the end insulation, are adapted to support the coils, for shipping purposes. Although the inner and outer insulation may be placed, then the end insulation placed and the respective ends of the housing attached in position, it may normally be found more convenient to utilize a foam insulation, as of a conventional type. Thus, one end of the housing may be attached and the foam introduced through the open end but the inside of the housing may be more completely filled by providing one end of the housing with a small hole through which the insulation foam may be introduced after both housing ends are attached. Such a hole may be tapped so that it may be closed with a plug after the foam insulation has been introduced.

The winding of each coil in which each of the respective tubes leaves the assembly a distance from the end of the preceding coil, such as from the groove between the second and third to last turns of the preceding coil, not only facilitates the attachment of the respective coils together and the bending of the end of the tube into an appropriate position adjacent the remaining tubes carrying the same liquid, but also permits all of the coils to be formed of tubes of the same diameter with an appropriate diameter of the inner coil. In addition, a mandrel of an appropriate size, such as between 10 and 11 inches in diameter for ½ inch tubes and an appropriate length for each tube, will permit each successive outer tube to have one less turn and have approximately the same length from one end of the coil to the other, such as within 5%, so that each tube will have generally the same total volume. Thus, the flow of the liquid through each tube will reach the opposite end at approximately the same time.

Figure 11:
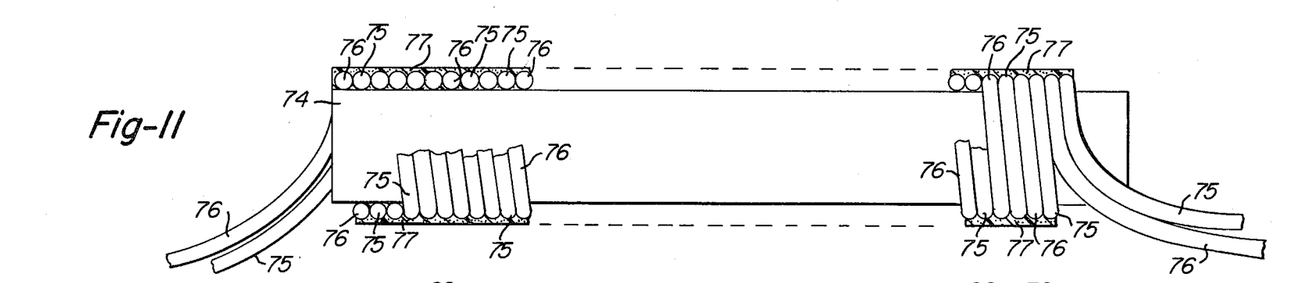
FIG. 11 is a side elevation of a first dual tube coil of an alternative arrangement, after winding on a mandrel and the application of a mastic layer to the outside thereof.
Figure 12:
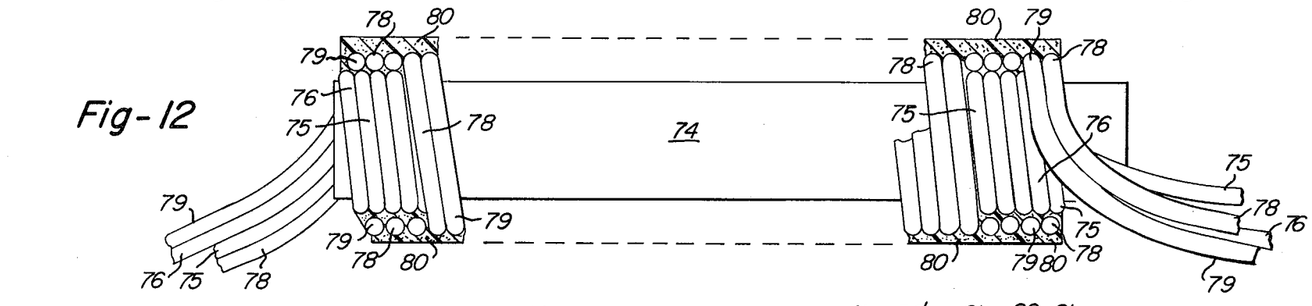
FIG. 12 is a side elevation showinRg a second dual tube coil of larger tubing, wound on the first coil of FIG. 11 and a layer of mastic applied to the outside thereof.
Figure 13:
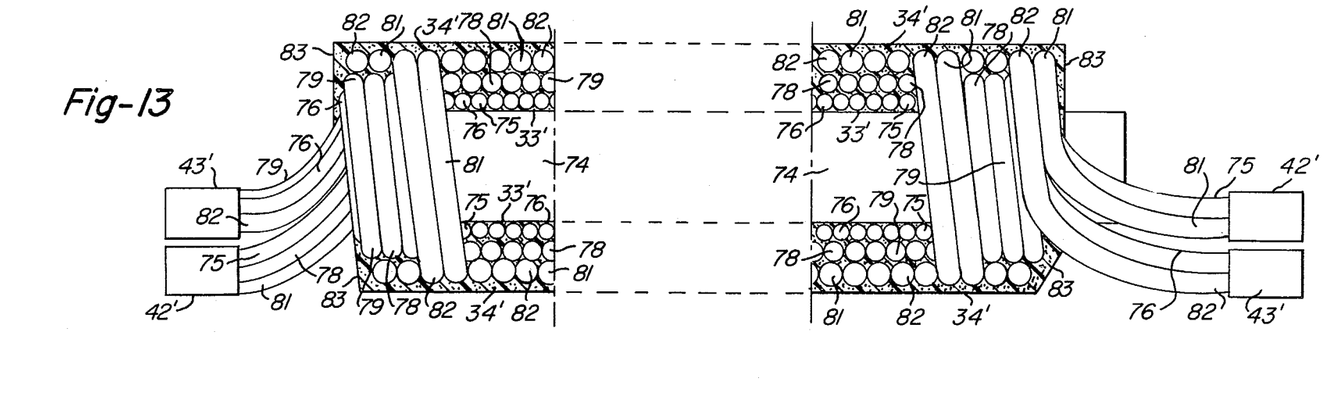
FIG. 13 is a side elevation showing a third dual tube coil, of still larger tubing, after winding on the coil of FIG. 12, removal of the mandrel, application of mastic to both the inside and outside and installation of sets of corresponding tubing ends in sleeves.

The diameter of the tubes of successive coils may be increased, for each coil, in order to provide a total volume in each tube corresponding to the length of a tube around its spiral path, and at the same time, retain essentially the same length for each of the coils, so that the liquid flowing through each tube would require approximately the same time to reach the opposite end. The method of producing such a construction is illustrated in FIGS. 11-13, it being understood that, although only three coils are shown, additional coils may be added with proper proportioning of the diameters of the tubes forming the same. In addition, the ends of the tubes carrying the same liquid may be positioned in the same manner or differently than in connection with previous embodiments. Thus, the initial coil may be wound on a rotating mandrel 74, with the first coil being wound by bending tubes 75 and 76, so as to extend essentially longitudinally of the mantrel, when wound onto the mandrel as it rotates, until the end of the coil is reached, with each end of tubes 75 and 76 being bent to extend substantially longitudinally of the mandrel. As before, the adjacent turns of the inner tube may be attached together, as by soldering. Then, a layer 77 of mastic may be applied to the outside of the tubes 75 and 76. As in FIG. 12, a second coil may be wound by bending the ends of tubes 78 and 79 to a position extending generally longitudinally of the mandrel and adjacent the ends of tubes 75 and 76. As before, tubes 78 and 79 are wound against the mastic layer 77 applied to the outside of the first coil, with tubes 78 and 79 in abutting relation and the first turn of the second coil being attached to the first turn of the preceding coil and disposed merely outwardly thereof. The tubes 78 and 79, of course, have a slightly greater diameter than tubes 75 and 76. When the opposite end of the second coil is reached, the last turn of the second coil is attached to the last turn of the first coil. It will be noted that tubes 75 and 78 form the first turn of each of the first and second coils, but that tubes 76 and 79 form the last turn of the respective coils. This arrangement is for the purpose of obtaining interleaved coils from the tubes 75, 76 and from the tubes 78, 79 of the same tube length, and therefore total volume. The ends of the tubes 78 and 79, after attachment of the last turn of tube 79, are again bent to extend generally longitudinally of the mandrel, rather than tangentially. Also, a layer 80 of mastic is applied to the outside of the second coil, as in FIG. 12, after which the third coil comprising tubes 81 and 82 are wound on the second coil, as in FIG. 13, with the first turn of the third coil being placed atop the first turn of the second coil. The tubes 81 and 82 are wound against the mastic layer 80, so as to squeeze any air out of the mastic, push the mastic into the interstices between the turns of the second coil and also between the interstices of the third coil, as well as into the interstices between the second and third coils. Again, after the last turn of the third coil, i.e. of tube 82, has been wound and attached to the turn of tube 79 beneath, the ends of tubes 81 and 82 are again bent, so as to extend generally longitudinally of the mandrel. While still on the mandrel, the respective ends of tubes 75, 78 and 81 may be inserted within a sleeve or sheath 42' and then the outside of the tubes attached to each other and to the inside of the sleeve, such as by Sil-Fos, as described previously in connection with the sleeve 43 of FIG. 4. Similarly, the respective ends of tubes 75, 78 and 81 may be inserted within and attached to the inside of a corresponding sheath or sleeve 43'. Then, the coil assembly may be removed from the mandrel and an inside layer 33' of mastic applied to the inside of the innermost coil and an outside layer 34' of mastic applied to the outermost coil. Also, the mastic may be spread against the ends of the coils, as at 83. The coil is then readily placed within a housing with insulation on the inside and the outside and at the ends, but the connections for the respective sleeves 42' and 43' extending through the ends of the housing, rather than the sides, as before.

Although a preferred embodiment of the method of this invention has been illustrated and described, as well as certain variations indicated, it will be understood that other embodiments may exist and additional variations made, all without departing from the spirit and scope of this invention.

What is claimed is:

1. A method of producing a multiple coil, liquid to liquid heat exchanger, wherein said coils are essentially concentric and are formed of multiple tubes, generally circular in cross section, in alternating longitudinal succession and through which a different liquid is circulated for transfer of heat to or from the liquid in adjoining tubes, comprising:

winding a first set of alternating, individual tubes simultaneously and in esentially abutting relation longitudinally to form a generally cylindrical inner coil;

applying a heat conductive mastic to the outside of said inner coil;

winding a second and corresponding set of individual tubes simultaneously and in essentially abutting relation longitudinally to form a second coil surrounding said inner coil, said second set of tubes being wound against the tubes of said first coil so as to press said tubes of said second coil against said tubes of said first coil and simultaneously compress the mastic layer and force said mastic into the spaces between adjoining tubes of said first coil, into the spaces between adjoining tubes of said second coil and into the spaces between generally opposed tubes of said first and second coils;

applying a heat conductive mastic to the outside of said second coil;

winding a third and corresponding set of individual tubes simultaneously and in essentially abutting relation longitudinally to form a third coil surrounding said second coil, said third set of tubes being wound against the tubes of said second coil so as to press said tubes of said third coil against the tubes of said second coil and simultaneously compress said mastic layer and force said mastic into the spaces between adjoining tubes of said second coil, into the spaces between adjoining tubes of said third coil and into the spaces between generally opposed tubes of said second and third coils; and similarly applying mastic to the outside of a coil and winding a set of tubes simultaneously and to form the next outer coil and force said mastic into the space between adjoining tubes of said previous coil, into the spaces between adjoining tubes of said next outer coil and into the spaces between generally opposed tubes of said previous coil and said next outer coil.

2. A method as defined in claim 1, wherein:
said mastic is applied to successive portions of the outside of the previous coil as a coil is wound.

3. A method as defined in claim 2, wherein:
said mastic is applied to the outside of the previous coil in the area beneath the tubes of the coil being wound.

4. A method as defined in claim 2 wherein:
said mastic is applied separately to each groove between adjacent turns of the previous coil and into which grooves the tubes of the coil being wound will move.

5. A method as defined in claim 1 wherein:
said mastic is applied to essentially the entire outside of a wound coil, prior to winding the next outer coil thereon.

6. A method as defined in claim 1, wherein:
the tubes of at least a plurality of the coils have essentially the same diameter and the turns of said coils engage grooves between turns of the next inner coil.

7. A method as defined in claim 1 wherein:
the tubes of one or more inner coils have a lesser diameter than the tubes of one or more outer coils and the first turn of each coil engages the groove between the first and second turns of the next inner coil; and
the tubes of one coil having the same diameter as the tubes of the previous coil engage the grooves between the turns of the previous coil.

8. A method of producing a multiple coil, liquid to liquid heat exchanger, wherein said coils are essentially concentric and are formed of multiple tubes, generally circular in cross section, in alternating longitudinal succession and through which a different liquid is circulated for transfer of heat to or from the liquid in adjoining tubes, comprising:

winding a first set of alternating, individual tubes simultaneously and in essentially abutting relation longitudinally to form a generally cylindrical inner coil;

applying a heat conductive mastic to the outside of said inner coil;

winding a second and corresponding set of individual tubes simultaneously and in essentially abutting relation longitudinally to form a second coil surrounding said inner coil, said second set of tubes being wound against the tubes of said first coil so as to press said tubes of said second coil against said tubes of said first coil and simultaneously compress the mastic layer and force said mastic into the spaces between adjoining tubes of said first coil, into the spaces between adjoining tubes of said second coil and into the spaces between generally opposed tubes of said first and second coils;

applying a heat conductive mastic to the outside of said second coil;

winding a third and corresponding set of individual tubes simultaneously and in essentially abutting relation longitudinally to form a third coil surrounding said second coil, said third set of tubes being wound against the tubes of said second coil so as to press said tubes of said third coil against the tubes of said second coil and simultaneously compress said mastic layer and force said mastic into the spaces between adjoining tubes of said second coil, into the spaces between adjoining tubes of said third coil and into the spaces between generally opposed tubes of said second and third coils;

the tubes of at least a plurality of coils have essentially the same diameter and winding succeeding outer coils by engaging the first turn of each coil with the groove between the first and second turns of the previous coil;

at the opposite end of each succeeding outer coil, leading the last turn of said coil away from said coil at a position between the second from last and third from last turns of the next inner coil; and similarly applying mastic to the outside of a coil and winding a set of tubes simultaneously to form the next outer coil and force said mastic into the space between adjoining tubes of said previous coil, into the spaces between adjoining tubes of said next outer coil and into the spaces between generally opposed tubes of said previous coil and said next outer coil.

9. A method of producing a multiple coil liquid to liquid heat exchanger, wherein said coils are essentially concentric and are formed of multiple tubes, generally circular in cross section, in alternating longitudinal succession and through which a different liquid is circulated for transfer of heat to or from the liquid in adjoining tubes, comprising:

winding a first set of alternating, individual tubes in essentially abutting relation longitudinally to form a generally cylindrical inner coil;

applying a heat conductive mastic to the outside of said inner coil;

winding a second and corresponding set of individual tubes in essentially abutting relation longitudinally to form a second coil surrounding said inner coil, said set of tubes being wound against the tubes of said first coil so as to press said tubes of said second coil against said tubes of said first coil and simultaneously compress the mastic layer and force said mastic into the spaces between adjoining tubes of said second coil and into the spaces between generally opposed tubes of said first and second coils;

applying a heat conductive mastic to the outside of said second coil;

winding a third and corresponding set of individual tubes in essentially abutting relation longitudinally to form a third coil surrounding said second coil, said third set of tubes being wound against the tubes of said second coil so as to press said tubes of said third coil against the tubes of said second coil and simultaneously compress said mastic layer and force said mastic into the spaces between adjoining tubes of said second coil, into the spaces between adjoining tubes of said third coil and into the spaces between generally opposed tubes of said second and third coils;

restraining, on one side of said coils and at closely adjacent points, the tubes extending to the first turn of each coil and carrying a first liquid;

restraining on the opposite side of said coils and at closely adjacent points, the tubes extending to a second turn of each coil and carrying a second liquid;

similarly applying mastic to the outside of a coil and winding a set of tubes to form the next outer coil and force said mastic into the space between adjoining tubes of said previous coil, into the spaces between adjoining tubes of said next outer coil and into the spaces between generally opposed tubes of said previous coil and said next outer coil; and similarly restraining the tubes extending to the first and second turns of said coils.

10. A method as defined in claim 9, which includes:

placing the ends of said tubes carrying said first liquid into a first sleeve;

placing the ends of said tubes carrying said second liquid into a second sleeve; and sealing the outsides of said tubes in the respective sleeves to such sleeve and to each other, whereby a flow of fluid to or from the respective sleeve will be confined to the interior of the respective sleeves and the tubes sealed therein.

11. A method as defined in claim 10, which includes:

at the opposite end of said coils, placing the ends of the respective tubes carrying said first liquid into a third sleeve;

at said opposite end of said coils, placing the ends of the respective tubes carrying said second liquid into a fourth sleeve; and sealing the outside of the respective tubes in the respective sleeve to each other and to such sleeve.

12. A method of producing a multiple coil, liquid to liquid heat exchanger, wherein said coils are essentially concentric and are formed of multiple tubes, generally circular in cross section, in alternating longitudinal succession and through which a different liquid is circulated for transfer of heat to or from the liquid in adjoining tubes, comprising:

winding a first set of alternating, individual tubes in essentially abutting relation longitudinally to form a generally cylindrical inner coil;

applying a heat conductive mastic to the outside of said inner coil;

winding a second and corresponding set of individual tubes in essentially abutting relation longitudinally to form a second coil surrounding said inner coil, said second set of tubes being wound against the tubes of said first coil so as to press said tubes of said second coil against said tubes of said first coil and simultaneosuly compress the mastic layer and force said mastic into the spaces between adjoining tubes of said first coil, into the spaces between adjoining tubes of said second coil and into the spaces between generally opposed tubes of said first and second coils;

applying a heat conductive mastic to the outside of said second coil;

winding a third and corresponding set of individual tubes in essentially abutting relation longitudinally to form a third coil surrounding said second coil, said third set of tubes being wound against the tubes of said second coil so as to press said tubes of said third coil against the tubes of said second coil and simultaneously compress said mastic layer and force said mastic into the spaces between adjoining tubes of said second coil, into the spaces between adjoining tubes of said third coil and into the spaces between generally opposed tubes of said second and third coils;

similarly applying mastic to the outside of a coil and winding a set of tubes to form the next outer coil and force said mastic into the space between adjoining tubes of said next outer coil and into the spaces between generally opposed tubes of said previous coil and said next outer coil;

winding the inner coil on a mandrel and the remaining coils against the next inner coil;

attaching the outside of a plurality of turns of the inner coil, including the first turn and the last turn, to the outside of an adjacent turn; and attaching the outside of at least the first turn and the last turn of each outer coil to the outside of the adjacent turn of the next inner coil, prior to winding the next outer coil.

13. A method as defined in claim 12, which includes:

attaching the respective turn to the respective adjacent turn by soldering and the like.

* * * * *